United States Patent
Amir

(10) Patent No.: US 8,547,433 B2
(45) Date of Patent: Oct. 1, 2013

(54) EXTENDED LIFE VIDEO CAMERA SYSTEM AND METHOD

(76) Inventor: Haim Amir, Ramat Hasharon (IL)

(*) Notice: Subject to any disclaimer, the term of this patent is extended or adjusted under 35 U.S.C. 154(b) by 870 days.

(21) Appl. No.: 12/267,592

(22) Filed: Nov. 9, 2008

(65) Prior Publication Data

US 2010/0118143 A1    May 13, 2010

(51) Int. Cl.
*H04N 7/18* (2006.01)

(52) U.S. Cl.
USPC .......................................................... 348/143

(58) Field of Classification Search
USPC .......................................................... 348/143
See application file for complete search history.

(56) References Cited

U.S. PATENT DOCUMENTS

| | | | | |
|---|---|---|---|---|
| 4,540,977 A | * | 9/1985 | Taillens et al. | 340/552 |
| 5,495,228 A | * | 2/1996 | Futsuhara et al. | 340/507 |
| 5,495,288 A | * | 2/1996 | Broady et al. | 348/155 |
| 5,936,666 A | * | 8/1999 | Davis | 348/143 |
| 6,570,499 B2 | * | 5/2003 | Kaganer | 340/541 |
| 6,864,805 B1 | * | 3/2005 | Gomez | 340/945 |
| 6,970,183 B1 | * | 11/2005 | Monroe | 348/143 |
| 7,023,913 B1 | * | 4/2006 | Monroe | 375/240.01 |
| 7,131,136 B2 | * | 10/2006 | Monroe | 725/105 |
| 7,151,469 B2 | * | 12/2006 | Gomez et al. | 340/945 |
| 7,463,146 B2 | | 12/2008 | Reibel | |
| 7,548,803 B2 | * | 6/2009 | MacCarthy | 701/36 |
| 7,733,371 B1 | * | 6/2010 | Monroe | 348/153 |
| 7,784,080 B2 | | 8/2010 | Renkis | |
| 7,874,744 B2 | * | 1/2011 | Cirker | 396/427 |
| 7,940,973 B2 | * | 5/2011 | Lee et al. | 382/128 |
| 7,974,454 B1 | * | 7/2011 | Lee et al. | 382/128 |
| 8,131,145 B2 | * | 3/2012 | Scheucher | 396/278 |
| 8,144,184 B2 | * | 3/2012 | Carter | 348/14.06 |
| 8,154,581 B2 | * | 4/2012 | Carter | 348/14.06 |
| 8,164,614 B2 | * | 4/2012 | Carter | 348/14.06 |
| 2006/0075065 A1 | * | 4/2006 | Renkis | 709/217 |
| 2008/0036595 A1 | | 2/2008 | Hollstien | |
| 2008/0151050 A1 | | 6/2008 | Self | |

* cited by examiner

*Primary Examiner* — Philip B Tran
(74) *Attorney, Agent, or Firm* — Mark M. Friedman

(57) ABSTRACT

It is disclosed an extended-life video detector assembly (VDA) directable at a viewing region. The VDA includes a video camera module having a normally inactive state, and a passive detection module (PDM) for selective activation of the video camera module. A battery powers the VDA for an extended period of at least two years. The VDA may include a control panel assembly (CPA) positioned within a communication range from the VDA for sending and receiving wireless signals to and from the VDA, and a central monitoring station located remotely from the CPA and communicating with it. Also the VDA includes a recording module, for recording video information. The PDM discriminates movement of an object in the viewing region and consequently activates the video camera module, based on characteristic parameters like temperature, size, movement direction, and movement speed.

19 Claims, 4 Drawing Sheets

EXTENDED LIFE VIDEO CAMERA SYSTEM AND METHOD

FIELD AND BACKGROUND OF THE INVENTION

The present invention relates to remotely-operated surveillance systems and in particular to an extended-life video camera system and method.

In the description and claims with follow hereinbelow, the expression "monitored region" means an area that is monitored by a security system. The monitored region could be a room or many rooms within a building or another defined monitored region. In similar fashion, in the description and claims with follow hereinbelow, the term "viewing region" is meant to be a monitored region where one or more radiation sensors and/or cameras are employed to view the monitored region, as part of a security system.

Frequently, with current security systems, when an alarm is sounded by the security system protecting a monitored region a central monitoring station (CMS) does not have specific information as to the nature of the alarm. In fact, the alarm could be false or real. In the case of a real alarm it could be either human error (i.e. owner entering his home without disarming the system) or a real burglary/intrusion.

To better ascertain the nature of the alarm, some systems allow a human operator working with the CMS, using the alarm system, to listen to voices or other sounds in the monitored region. Based on those voices/sounds the operator can decide whether to alert the police or to decide upon a false alarm. In many cases such voice verification is not sufficient to determine/understand what is taking place in the monitored region. As a result, the operator is frequently compelled to alert the police—even though the alarm has not been better verified as false or real.

The term "real alarm integrity", as used in the description and claims which follow hereinbelow, is intended to mean the robustness of a real alarm determination, in distinction between a false and a real alarm, as described above. The term "enhance real alarm integrity" is therefore intended to mean better determining and enhancing the reliability and robustness of a real alarm.

In many countries today there is a demand for additional sensor and video verification of an alarm to enhance real alarm integrity.

Some security systems employ a passive infrared (PIR) detector to sense the presence of a heat-radiating body (i.e., such a heat-radiating body would typically indicate the presence of an unauthorized person) in its field of view in the monitored region. A single sensor can be used to provide a signal, which when suitably processed and compared with a predetermined condition, can indicate, for example, the presence of an unauthorized person. However, the use of a single sensor is also likely to detect other effects (e.g. air disturbance, heating, pets, etc) which may also match predetermined conditions—and a false alarm may occur. Including a video camera in the system can contribute to enhancing real alarm integrity.

Davis, in U.S. Pat. No. 5,936,666, whose disclosure is incorporated herein by reference, describes a system for combining a PIR sensor and a video CCD device. Among other features, there is an apparatus which includes at least two sensors whose overlapping fields of view are matched by sectorization. Sensor signal output processing of a high resolution sensor and a low resolution sensor provide a detection device which achieves a substantially higher performance over devices which only logically combine the outputs of two individual detectors. In a particular embodiment, the high resolution sensor senses a visible wavelength, such as by video camera, and the low resolution is an infrared thermal sensor.

Renkis, in US Patent Publication no. 2006/0075065 A1, whose disclosure is incorporated herein by reference, describes a surveillance system for wireless communication between components comprising: a base system including at least two wireless input capture devices (ICDs), the ICDs having at least one sensor and at least one input component for detecting and recording inputs, a processor, a memory, a transmitter/receiver, all constructed and configured in electronic connection; wherein the ICDs are operable for wireless cross-communication with each other, following a single click-select action by a user on a user interface with the system. Renkis describes one of the ICD's as a conventional light video camera and/or an IR video camera.

Few details as to the power source of the prior art systems are described; and it appears that the systems are limited in that they are not truly remote, since no battery power is used; rather mains power is employed. Furthermore, the overall prior art systems appear to utilize more expensive components. In general, attention to system component and overall cost and energy consumption appear to be lacking in prior art systems.

There is therefore a need for a reliable, cost-effective, extended-life video camera system that enhances real alarm integrity.

SUMMARY OF THE INVENTION

The present invention relates to an extended-life video camera system and method.

According to the teachings of the present invention there is provided an extended-life video camera system comprising a video detector assembly (VDA) directable at a viewing region, the VDA having: a video camera module maintainable in a normally inactive state; a passive detection module (PDM) operatable to selectively activate the video camera module; and a non-mains power source capable of powering the VDA for an extended period. Most preferably, the extended-life video camera system further includes: a control panel assembly (CPA) positionable within a communication range from the VDA and operatable to send and receive wireless signals to and from the VDA; and a central monitoring station (CMS) locatable remotely from the CPA, the CPA further operatable to send and receive wireless signals to and from the CMS. Preferably, the VDA further includes a recording module, operatable to record video information from the video camera module.

Typically, the non-mains power source is a battery. Most typically the extended period is at least 2 years. Preferably, the PDM is operatable to discriminate movement of at least one object in the viewing region to selectively activate the video camera module, based on at least one object sensed characteristic parameter. Most preferably, the sensed characteristic parameter includes at least one chosen from a list including: temperature; size; movement direction; and movement speed. Typically, the PDM includes a DragonFly™ lens.

Most preferably, the VDA is operable to download video information to the CPA. Preferably, the CPA is operable to download video information to the CMS. Typically, the communication range is up to 1000 meters.

According to the teachings of the present invention there is further provided a method of using an extended-life video camera system comprising the steps of: directing a video detector assembly (VDA) at an viewing region, the VDA having: a video camera module maintained in a normally inactive state; a passive detection module operated to sense movement in the viewing region and to selectively trigger activation of the video camera module; a recording module, operated to record video information from the video camera module; and a power source capable of powering the VDA for an extended period, positioning a control panel assembly (CPA) within a communication range from the VDA; and locating a central monitoring station remotely from CPA. Most preferably, the method further includes: positioning a control panel assembly (CPA) within a communication range from the VDA and operating the CPA to send and receive wireless signals to and from the VDA; and locating a central monitoring station (CMS) remotely from the CPA, the CPA further operated to send and receive wireless signals to and from the CMS.

Preferably, the non-mains power source is a battery. Typically, the extended period is at least 2 years. Most preferably, the PDM is operated to discriminate movement of at least one object in the viewing region to selectively activate the video camera module, based on at least one object sensed characteristic parameter. Typically, the sensed characteristic parameter includes at least one chosen from a list including: temperature; size; movement direction; and movement speed. Most typically, the VDA is operable to download video information to the CPA and the CPA is operable to download video information to the CMS. Preferably, the communication range is up to 1000 meters.

BRIEF DESCRIPTION OF THE DRAWINGS

The invention is herein described, by way of example only, with reference to the accompanying drawings, wherein.

DESCRIPTION OF PREFERRED EMBODIMENTS

The present invention relates to an extended-life video camera system and method.

Figure 1:
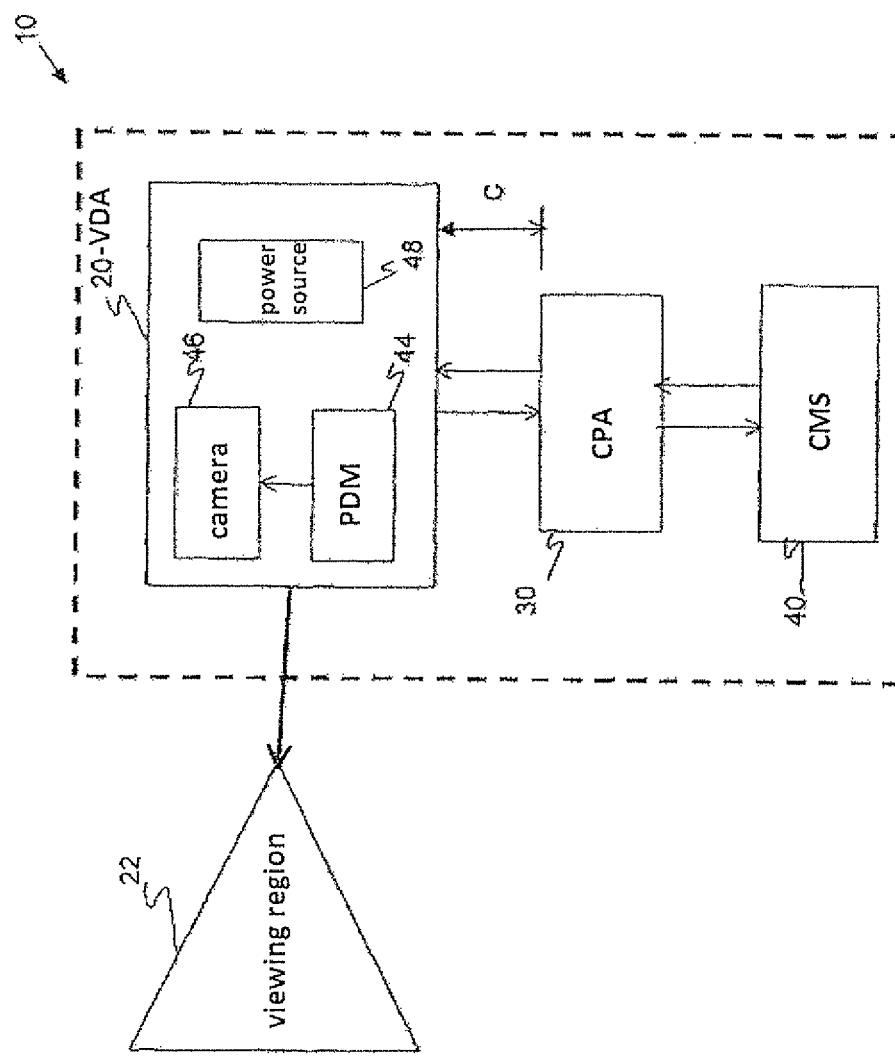
FIG. 1 is a schematic block diagram of an extended-life video camera system, in accordance with an embodiment of the present invention.

Reference is now made to FIG. 1, which is a schematic block diagram of an extended-life video camera system 10, in accordance with an embodiment of the present invention. The extended-life video camera system comprises: a video detector assembly (VDA) 20 directed at a viewing region 22; a control panel assembly (CPA) 30, which is positioned with a communications range "c" from the VDA; and a central monitoring station (CMS) 40. CPA 30 functions to communicate with and to transfer commands to VDA 20. In embodiments of the current invention, the communications range c can vary up to 1000 meters and communications between the VDA 20 and CPA 30 is preferably by wireless means, although wired means may also be employed. The VDA is typically located in another room or another floor or another adjoining building from the CPA. In embodiments of the current invention, typically, VDA 20 and CPA 30 are located remotely from CMS 40. The CMS is typically located in a central facility, which—for example—may be located kilometers from VDA 20 and CPA 30. CMS 40, would typically be in contact with other CPA's, and one or more human operators would be able to oversee operations of the CMS.

The VDA comprises a passive detection module (PDM) 44, a normally inactive camera module 46, and a non-mains power source 48 capable of powering the VDA for an extended period. In an embodiment of the current invention, PDM 44 is a passive infra-red (PIR) sensor having electronics and software, as known in the art, to enhance real alarm integrity. When PDM 44 has sensed an alarm situation and the PIR electronics have further enhanced real alarm integrity, the PDM triggers camera module 46 to become active. In one embodiment of the current invention, camera module 46 includes a CMOS imaging sensor, as know in the art. Once camera module 46 is active/activated and imaging has begun, imaging data is stored on-board the VDA by media such as but not limited to: SDRAM, in uncompressed and then compressed format; flash memory; and SD card memory. Non-volatile flash memory is employed, inter alia, to minimize power consumption. Management of frame rate (for which an exemplary value of 5 frames per second is typical), video duration (for which an exemplary value of 5 seconds is typical), and compression and handling of image data is performed by the on-board electronics—not shown in the figure. Further details of functioning and a sequence of operational steps of extended-life video camera system 10 are described hereinbelow. In one embodiment of the current invention, VDA 20 has a tilt switch (not shown in the figure) which can sense if the VDA has been shifted/tampered; and a such indication may be signalled to CPA 30.

The camera module is normally not-active—being activated only for the short periods of time when imaging is performed. Additionally, components of the VDA are chosen to minimize power consumption. Communications between VDA 20 and CPA 30 are managed by electronics and logic devices on-board the VDA—not shown in the figure—and are likewise managed to minimize power consumption. Furthermore an RF communications protocol is employed to minimize power consumption. In this manner, the overall power consumption of VDA 20 is minimized and the life of non-mains power source 48 is maximized. Non-mains power source 48 can be a long life battery, such as but not limited to a lithium-type or other long-life batteries. Additionally or optionally, mains power source 48 can utilize a combination of rechargeable technologies afforded by, but not limited to: solar cells, replaceable or rechargeable batteries, etc. In one embodiment of the current invention, non-mains power source 48 is designed to provide at least 3-years' full operation of the VDA. The following discussion provides information on camera module 46 and non-mains power source 48.

Exemplary Video Camera and Power Consumption Calculations

One exemplary video camera useable in the system described hereinabove is a visible light, ¼-Inch SOC VGA CMOS digital image sensor, having a system-on-a-chip (SOC) integrated system; ultra low-power CMOS image sensor; superior low-light performance; and up to 30 fps progressive scan at 27 MHz for high quality video at VGA resolution.

Calculated power consumption, as shown below, for the VDA yields a battery life of over approximately 2.4 years, under typical operating and environmental conditions. The calculation, combined with potential improvements to the system, yield high confidence that battery life can be extended to 3 years and beyond.

| Energy Consumption | Current A | Time S | Energy Ah | Energy per day Ah |
|---|---|---|---|---|
| Steady State Consumption | | | 9.0E−6 | 216.0E−6 |
| A Single TX/RX Detection Cycle | 6.3E−3 × | 572.0E−3 = | 996.5E−9 | 99.6E−6 |
| Wake on radio (WOR) | 14.0E−3 × | 4.8E−3 = | 18.7E−9 | 2.2E−3 |
| Temperature Readings | 1.0E−3 × | 40.0E−3 = | 11.1E−9 | 3.2E−6 |
| Video cycle + RF without Flash led | 119.4E−3 × | 50.9E+0 = | 1.7E−3 | 844.3E−6 |
| Video cycle + RF with Flash led | 120.9E−3 × | 50.9E+0 = | 1.7E−3 | 855.2E−6 |
| Detection During Sleep Mode | 800.0E−6 × | 6.0E−3 = | 1.3E−9 | 5.8E−6 |
| Total average consumption | | | daily | 4.3E−3 |
| | | | hourly | 177.7E−6 |
| Total battery life | | | days | 897 |
| | | | years | 2.38 |

Assumptions for this calculation and notes are listed below.

| Assumptions: | |
|---|---|
| STATUS transmissions/day | 100 |
| max WOR/day | 120000 |
| temperature readings/day | 288 |
| video cycles without flash/day | 0.5 |
| video cycles with flash/day | 0.5 |
| movements in room/day | 4320 |
| No. of batteries | 3 |
| Battery capacity | 1.3E+0 |
| Capacity lost per year @ 30 C. | 2% |

Notes:
1. "Steady State Consumption" is the passive battery consumption of the VDA.
2. "Single TX/RX Cycle" means a single transmission/reception cycle.
3. Assumptions for the number of respective cycles-per-day are listed and "Energy per day" is the product of "Energy"×cycles-per-day.
4. It is assumed the battery/batteries lose (as self-discharge) 2% of the charge per year.

Figure 2:
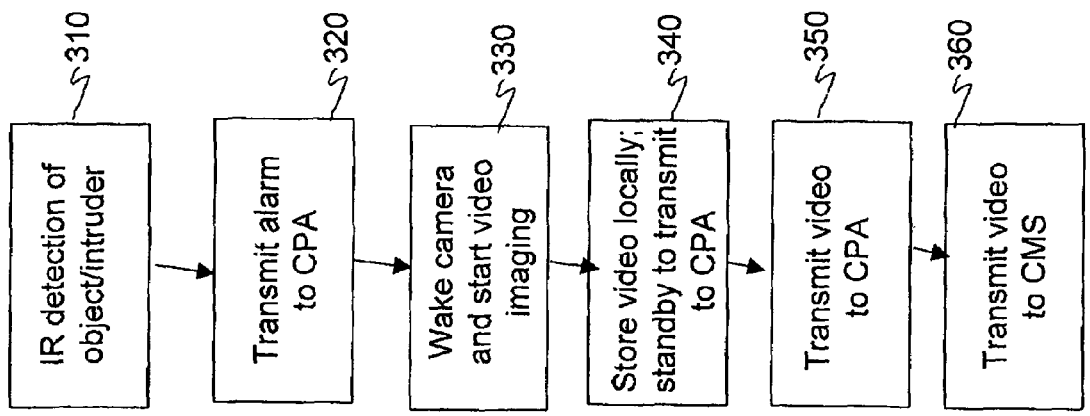
FIG. 2 is a flow chart of operational steps of the extended-life video camera system shown in FIG. 1, in accordance with an embodiment of the present invention.

Reference is now made to FIG. 2, which is a flow chart of salient operational steps of the extended-life video camera system shown in FIG. 1, in accordance with an embodiment of the present invention. The first step, "IR detection of object/intruder" 30, is performed as the PDM module senses an object. As noted hereinabove, PDM electronics evaluate the object being sensed. Parameters such as, but not limited to: temperature, movement speed, and size may be evaluated by the PDM to enhance real alarm integrity before, proceeding to the next step "Transmit alarm to CPA" 320. A thermistor (not shown in the figures) located the VDA monitors ambient temperature in order to determine if PDM module signal amplification is necessary, as described hereinbelow. If the ambient temperature is approximately 10 degrees lower or higher than a predetermined value (30 degrees C., for example, which represents a typical sensed temperature of a person) the PDM module signal is not amplified. However if the ambient temperature is within the approximate +/−10 degree difference of the predetermined value, the PDM module signal is amplified to ensure higher sensitivity of object temperature/person measurement. If it is determined that this is not a real alarm, then logic flow stops (not shown in the figure) and the system is readied for the next detection.

Following the determination by the PDM electronics that the alarm is real, an alarm is transmitted to the CPA, and from there it may be further transmitted to the CMS to allow near real-time information to be received at the CMS about an intrusion in progress. Alternatively or additionally, in an embodiment of the current invention, a sound and/or a prerecorded message is sounded by the VDA to alert the intruder that his presence has been sensed. The sound/prerecorded message further serves to draw the intruder's attention so that he turns his face in the direction of the VDA, to allow an image of his face to be made, as described hereinbelow.

The step "Wake camera and start video imaging" 330 follows, as the camera module is activated to image video. Step 330 occurs typically substantially simultaneously with step 320, although a time delay ranging from a small fraction of a second to a longer time, such as a second or more may be applied. A time delay between steps 320 and 330 may be applied, for example, when a sound/recording is played and the camera module is activated to better ensure the intruder is facing the VDA. In one embodiment of the present invention, an ambient light measurement is performed (not shown in the figure) before the camera module begins imaging, allowing the camera module to subsequently more rapidly image with correct ambient light settings. In another embodiment of the present invention, should ambient lighting conditions be below a certain threshold, a white LED (not shown in FIGS. 1 and 2), positioned on the VDA and facing the viewing region, is powered to enhance ambient light during video imaging. Additional information regarding step 330 is provided hereinbelow.

The step "Store video locally; standby to transmit to CPA" 340 follows video imaging. In this step, video imaging is stored in the VDA as noted hereinabove in FIG. 1. Substantially in parallel, a signal is sent to the CPA to alert that a video has been stored. The CPA may, in turn, send an alert and/or be queried by the CMS regarding the stored video images.

Stored video information is transmitted to the CPA in step 350 "Transmit video to CPA". Whereas embodiments of the present invention may have the video information transmitted to the CPA substantially immediately after being stored in the VDA, a preferred embodiment is for the VDA to respond to the CPA, commanding a download of the video information. In addition to other reasons, VDA power is conserved by transmitting video information only in response to CPA commands, since in there may be circumstances when the CMS does not want and/or does not need the video information.

Once video information is received from the VDA by the CPA, it is stored. In step 360, "transmit video to CMS", the stored video information is transmitted to the CMS, either automatically by the CPA, or in response to specific command or commands by the CMS.

Figure 3:
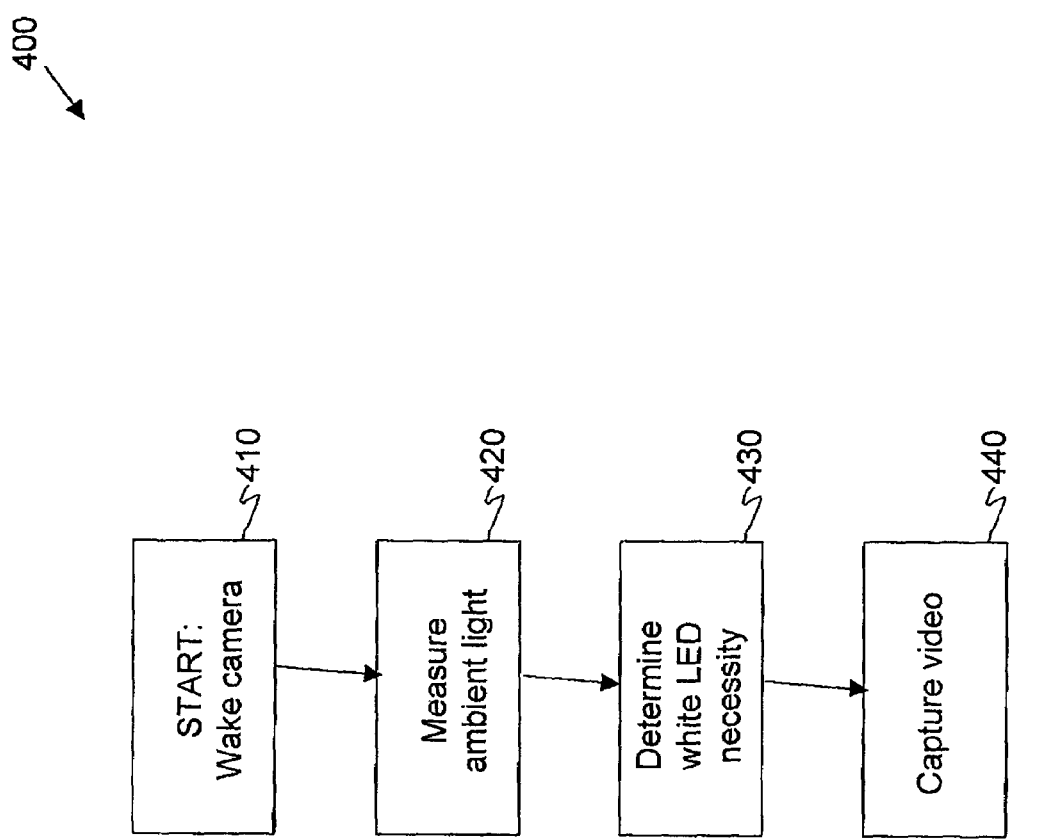
FIG. 3 is a flow chart detail of one step of the flow chart shown in FIG. 2, in accordance with an embodiment of the present invention.

Reference is now made to FIG. 3, which is a flow chart detail of step 330 of the flow chart shown in FIG. 2, in accordance with an embodiment of the present invention. In step 410 "wake camera", the camera module (as shown in FIG. 1) is activated as previously described hereinabove. In step 420 "measure ambient light", ambient light of the viewed region is measured by a dedicated solid state sensor (not shown in the figures), independent of the camera of the camera module. The use of an independent sensor shortens system response time. The sensor output is used in step 430 "determine white LED necessity" to determine whether or not to illuminate a white LED (not shown in the figures) configured to further illuminate the viewing region in cases of low light intensity. The ambient light level measured by the sensor (not shown) also serves to minimize CMOS camera stabilization time, with the CMOS camera receiving the light level value measured by the sensor acting as an initial/approximate value, from which the camera then further stabilizes and proceeds to take images. The last step, 440, "capture video" then follows.

Figure 4B:
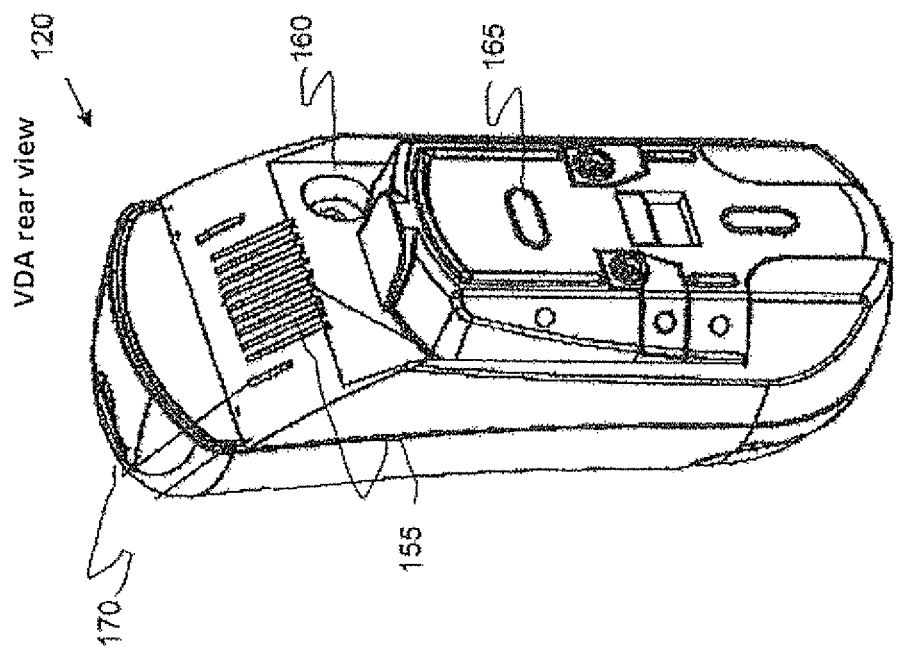
FIGS. 4A and 4B are front and rear pictorial views of a video detector assembly, in accordance with an embodiment of the present invention.
Figure 4A:
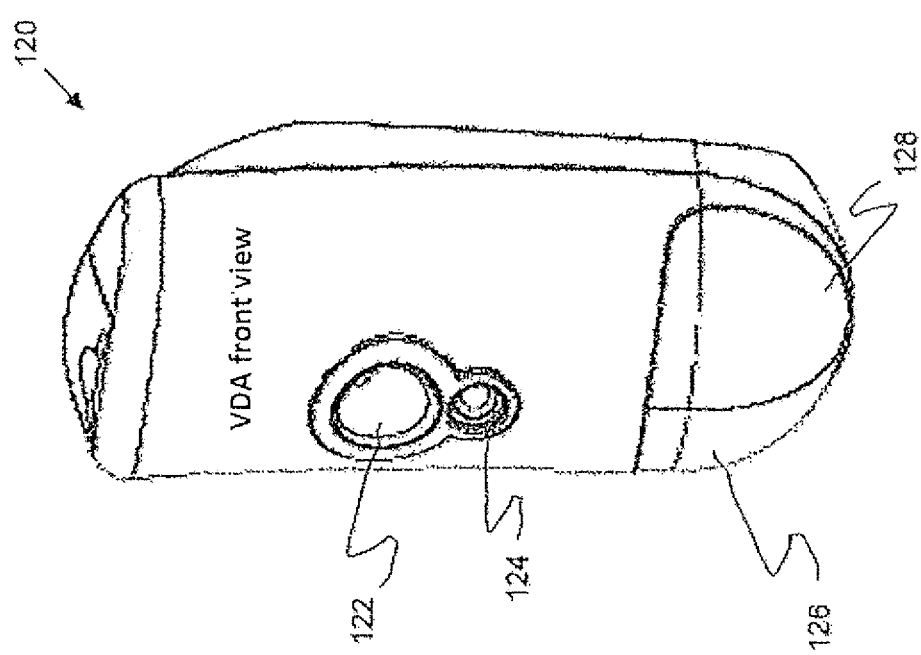

Reference is now made to FIGS. 4A and 4B, which are front and rear pictorial views of a video detector assembly (VDA) 120, in accordance with an embodiment of the present invention. Apart from differences described below, VDA 120 is generally similar to the VDA shown in FIG. 1 and descriptions in FIGS. 2 and 3. VDA 120 includes elements generally identical in configuration, operation, and functionality as described hereinabove. As can be seen in FIG. 4A, VDA 120 includes: a lens 122 of the camera module mentioned hereinabove; a white LED 124, a passive detection module (PDM) 126 having a DragonFly™ lens (not shown in the figure); and an ambient light intensity sensor 128. Furthermore, as can be seen in FIG. 41B the VDA includes: a speaker 155, a DC jack 160 to provide optional external power to the VDA; a wall-mounting bracket 165, and an optional SD memory card 170.

The DragonFly™ lens of the PDM may comprise a plurality of smaller sub-lenses, each lens designed to cover a part of the monitored region. In one embodiment of the current invention, the DragonFly™ lens consists of 62 sub-lenses. The size of each individual sub-lens is determined by the required detection range. The number of sub-lenses in the DragonFly™ lens is determined according to the required detection zones and their field of view angles. In a typical implementation certain field of view may not be included for detection by eliminating or masking sub-lenses. The sub-lens material allows transmission of infra red radiation, typically having wavelengths ranging from approximately 7-15 micrometers.

As noted hereinabove, the PDM acts as the initial movement detector. To enhance real alarm integrity an algorithm is utilized to screen out false alarms. The detector of the PDM outputs an analog signal. A moving object sensed by the PDM yields signal pulses that are amplified and compared to pre-defined threshold values. When a threshold is exceeded, the signal duration is checked to verify that the signal pulse width is larger than a typical value of 100 ms. Typically, the algorithm filters pulses that are too short, meaning threshold momentary spikes or noise.

The PDM comprises a dual-element detector (not shown in the figures), which enables the PDM to differentiate between left-to-right and right-to-left movements within the viewing region. The dual-element detection enhances the integrity of the alarm and reduces false alarms.

As noted hereinabove, real alarm integrity is enhanced by sensing an object temperature and comparing it to the temperature of the surroundings. Typically, human skin has a temperature of 30 degrees C. A strong signal is sensed by the PDM when the surrounding temperature is significantly different than the temperature of the object, i.e. significantly different than 30 degrees C. Conversely, a weaker signal is sensed when the surrounding temperate is relatively similar to the temperature of the object. Therefore, the surrounding temperature is periodically sensed and the gain of the PDM amplifiers is determined and altered dynamically according to the surrounding temperature, to enhance object temperature measurement in reference to the surrounding temperature, and to reduce false alarms.

It will be appreciated that the above descriptions are intended only to serve as examples, and that many other embodiments are possible within the scope of the present invention as defined in the appended claims.

What is claimed is:

1. An extended-life video camera system comprising a video detector assembly (VDA) directable at a viewing region, the VDA having:
   a. a video camera module maintainable in a normally inactive state, no imaging being performed in said normally inactive state, energy consumption per day in said normally inactive state being at most 216.0E-6 Ampere hours;
   b. a passive detection module (PDM) operatable to selectively activate the video camera module, wherein activating said video camera includes initiating imaging of said viewing region; and
   c. a non-mains power source capable of powering the VDA for an extended period, said extended period being in accordance with said video camera being activated only for the short periods of time when imaging being performed;

and the VDA having
   d. no mains power source empowering the VDA.

2. An extended-life video camera system according to claim 1, further including:
   a. a control panel assembly (CPA) positionable within a communication range from the VDA and operatable to send and receive wireless signals to and from the VDA; and
   b. a central monitoring station (CMS) locatable remotely from the CPA, the CPA further operatable to send and receive signals to and from the CMS.

3. An extended-life video camera system according to claim 2, wherein the VDA further includes a recording module, operatable to record video information from the video camera module.

4. An extended-life video camera system according to claim 2, wherein the non-mains power source is a battery.

5. An extended-life video camera system according to claim 2, wherein the extended period is at least 2 years.

6. An extended-life video camera system according to claim 2, wherein the PDM is operatable to discriminate movement of at least one object in the viewing region to selectively activate the video camera module, based on at least one object sensed characteristic parameter.

7. An extended-life video camera system according to claim 6, wherein the sensed characteristic parameter includes at least one chosen from a list including: temperature; size; movement direction; and movement speed.

8. An extended-life video camera system according to claim 7, wherein the PDM includes a DragonFly™ lens.

9. An extended-life video camera system according to claim 7, wherein the VDA is operable to download-video information to the CPA.

10. An extended-life video camera system according to claim 9, wherein the CPA is operable to download video information to the CMS.

11. An extended-life video camera system according to claim 2, wherein the communication range is up to 1000 meters.

12. A method of using an extended-life video camera system comprising the steps of:
   a. viewing a region by a video detector assembly (VDA) directed at the viewing region, the VDA having:
      i. a video camera module maintained in a normally inactive state, no imaging being performed in said normally inactive state;
      ii. a passive detection module (PDM) operated to sense movement in the viewing region and to selectively trigger activation of the video camera module, wherein said activation of said video camera includes initiating imaging of said viewing region;
      iii. a recording module, operated to record video information from the video camera module;
      iv. a non-mains power source capable of powering the VDA for an extended period said extended period being in accordance with said video camera being activated only for the short periods of time when imaging being performed; and
      v. a wireless means for sending and receiving signals to and from a control panel assembly (CPA),
      and the VDA having
      vi. no mains power source empowering the VDA
   b. operating said control panel assembly (CPA) to send and receive wireless signals to and from the VDA whereas said CPA being positioned within a communication range from said VDA; and
   c. operating said CPA to send and receive wireless signals to and from a central monitoring station (CMS), whereas said CMS being located remotely from said CPA.

13. A method according to claim 12, wherein the non-mains power source is a battery.

14. An extended-life video camera system according to claim 13, wherein the extended period is at least 2 years.

15. A method according to claim 12, wherein the PDM is operated to discriminate movement of at least one object in the viewing region to selectively activate the video camera module, based on at least one object sensed characteristic parameter.

16. A method according to claim 15, wherein the sensed characteristic parameter includes at least one chosen from a list including: temperature; size; movement direction; and movement speed.

17. A method according to claim 16, wherein the VDA is operable to download video information to the CPA.

18. A method according to claim 17, wherein the CPA is operable to download video information to the CMS.

19. A method according to claim 12, wherein the communication range is up to 1000 meters.

* * * * *